(12) United States Patent
Hopwood (10) Patent No.: US 7,107,735 B2
(45) Date of Patent: Sep. 19, 2006

(54) COUPLING DEVICE

(75) Inventor: Ian Hopwood, Sheffield (GB)

(73) Assignee: Ultimate Design Solutions Ltd., Sheffield (GB)

( * ) Notice: Subject to any disclaimer, the term of this patent is extended or adjusted under 35 U.S.C. 154(b) by 0 days.

(21) Appl. No.: 10/974,610

(22) Filed: Oct. 27, 2004

(65) Prior Publication Data
US 2005/0072103 A1    Apr. 7, 2005

Related U.S. Application Data

(63) Continuation of application No. PCT/GB03/00381, filed on Nov. 13, 2003.

(51) Int. Cl.
*B25G 3/34* (2006.01)

(52) U.S. Cl. ............ 52/740.7; 52/726.1; 52/583.1; 403/305; 403/293

(58) Field of Classification Search ........... 52/740.7, 52/726.1, 583.1, 584.1; 403/305, 362, 293, 403/292
See application file for complete search history.

(56) References Cited

U.S. PATENT DOCUMENTS

| | | | |
|---|---|---|---|
| 1,689,281 A | | 10/1928 | Forssell |
| 3,415,552 A | * | 12/1968 | Howlett ............... 403/305 |
| 3,551,999 A | | 1/1971 | Gutmann |
| 3,850,535 A | * | 11/1974 | Howlett et al. ........ 403/305 |
| 4,408,926 A | | 10/1983 | Werner |
| 4,666,326 A | | 5/1987 | Hope |
| 5,046,878 A | | 9/1991 | Young |
| 5,152,118 A | * | 10/1992 | Lancelot ............... 52/726.1 |
| 5,193,932 A | | 3/1993 | Wu |
| 5,393,165 A | | 2/1995 | Rowan, Jr. |
| 5,419,217 A | * | 5/1995 | Umezawa et al. ....... 74/567 |
| 5,664,902 A | * | 9/1997 | Holdsworth ........... 403/362 |
| 5,909,980 A | * | 6/1999 | Holdsworth ........... 403/362 |
| 5,967,691 A | * | 10/1999 | Lancelot, III ......... 403/313 |
| 5,974,761 A | * | 11/1999 | Mochizuki et al. ..... 52/740.1 |
| 6,109,619 A | * | 8/2000 | Fine ..................... 279/83 |
| 6,202,282 B1 | | 3/2001 | Holdsworth |
| 6,532,711 B1 | * | 3/2003 | Gregel et al. .......... 52/583.1 |
| 6,679,024 B1 | | 1/2004 | Dahl |

FOREIGN PATENT DOCUMENTS

| | | |
|---|---|---|
| CH | 532 702 | 12/1970 |
| DE | 1200614 | 9/1965 |
| DE | 1264025 | 3/1968 |
| DE | 1675007 | 12/1970 |
| DE | 4 301 307 | 7/1994 |
| DE | 2 950 0727 | 1/1995 |
| EP | 0 348 060 | 6/1989 |
| EP | 0 554 972 | 8/1993 |
| FR | 2 721 641 | 12/1995 |
| GB | 631 786 | 11/1947 |
| GB | 2 127 512 | 9/1983 |
| GB | 2 220 241 | 6/1989 |

* cited by examiner

*Primary Examiner*—Carl D. Friedman
*Assistant Examiner*—Basil Katcheves
(74) *Attorney, Agent, or Firm*—Renner, Otto, Boisselle & Sklar, LLP (57) ABSTRACT

A coupling device for the coupling of reinforcing bars, the coupling device comprising an elongate tubular body configured for receiving reinforcing bars, in particular their end portions, at least one recessed gripping surface being formed on an inner surface of the elongate tubular body, the recessed gripping surface comprising a plurality of teeth being configured to engage the reinforcing bars in response to the engagement of the reinforcing bars by a plurality of engaging bolts being adjustably positioned through the elongate tubular body.

40 Claims, 9 Drawing Sheets

COUPLING DEVICE

This application is a continuation of International Application No. PCT/GB03/00381, filed Jan. 30, 2003, which was published in English as WO 03/093601, and which claims priority from GB 0209943.0 and GB 2029944.8, both of which were filed on May 1, 2002.

FIELD OF THE INVENTION

The present invention relates to the coupling of bars, wires and cables, in particular but not exclusively, to the coupling of reinforcing bars used in structural concrete.

BACKGROUND TO THE INVENTION

There exists within the art apparatus and method for coupling reinforcing bars used in structural concrete, such coupling commonly involves the use of a tubular steel coupling body or sleeve configured to receive end portions of the reinforcing bars. Typically, the bars are held in place using a number of engaging bolts which engage into the surfaces of the bars wedging them against an inner surface of the tubular body thereby providing a couple.

Figure 1:
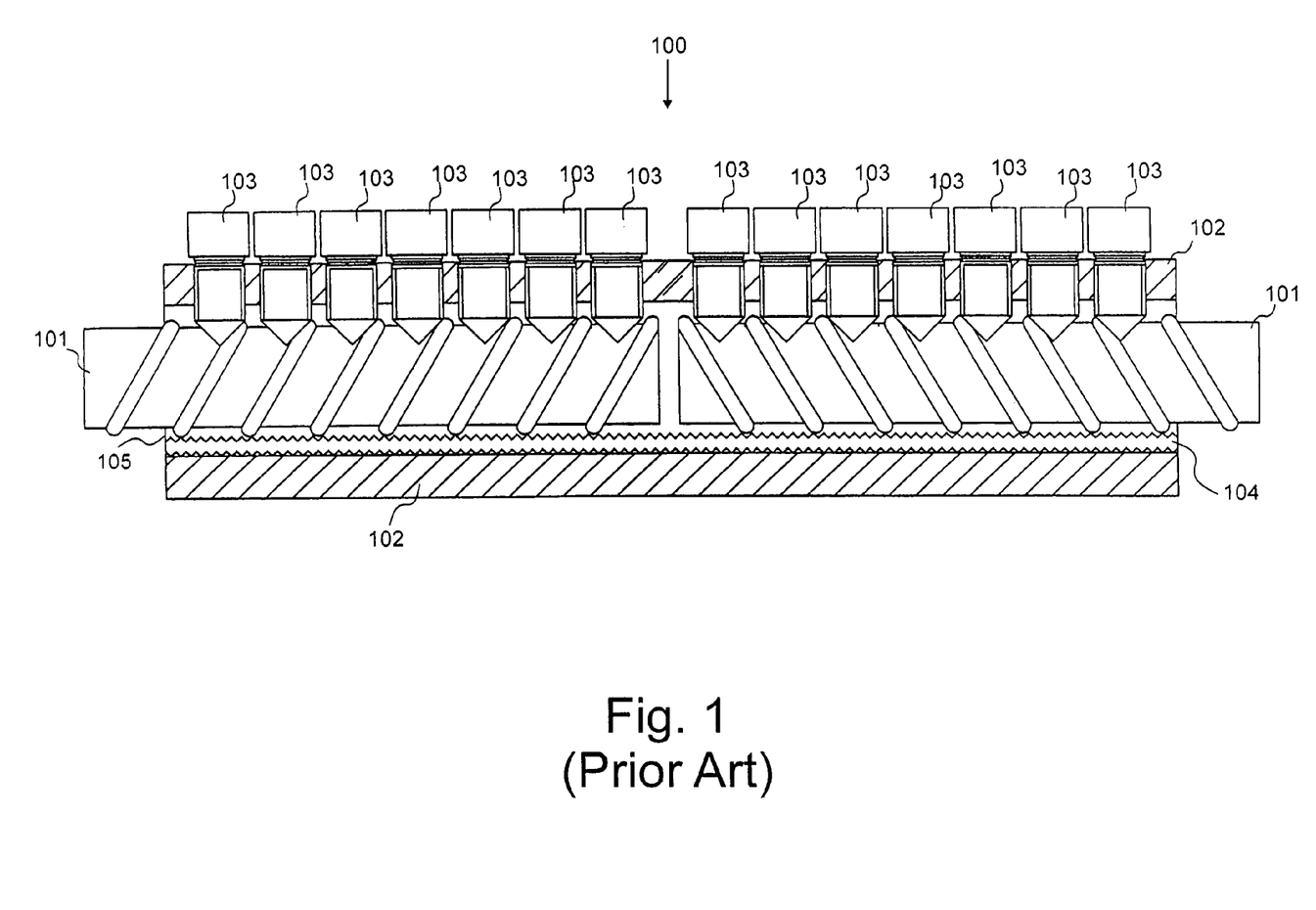
FIG. 1 illustrates a cross-sectional side elevation view of a prior art coupling device.

In particular, U.S. Pat. No. 5,046,878, GB 2220241 and EP 0554972 all disclose a reinforcing bar coupling system as detailed with reference to FIG. 1 herein. FIG. 1 herein illustrates a cross-sectional side elevation view of a bar coupling system found in the art comprising an elongate tubular body 102, a plurality of engagers 103, at least one gripping surface 104 and an inner surface 105. According to the prior art coupling device 100, elongate tubular body 102 receives reinforcing bar end portions 101 such that engagers 103 are adjustably positioned through the tubular body 102 and serve to wedge bars 101 against gripping surface 104, gripping surface 104 being wedged, in turn, against inner surface 105, thereby forming a couple.

According to EP 0554972 and with reference to FIG. 3 therein, the gripping surfaces may be formed as adjustably placed ribs extending the length of the tubular body, these ribs being provided with profiles so as to key into both the inner surface of the tubular body and the reinforcing bars. According to an alternative embodiment and with reference to EP 0554972 and FIG. 6 therein, the ribs may be formed integrally with the tubular body and project outwardly from the tubular body inner surface towards the center of the coupling device. According to both embodiments the reinforcing bars are configured to sit on top of the ribs so as to be positioned away from the inner surface of the tubular body.

U.S. Pat. No. 5,664,902, U.S. Pat. No. 5,909,980 and U.S. Pat. No. 6,202,282 disclose an elongate tubular body configured for receiving end portions of reinforcing bars in a similar manner to that described above with reference to FIG. 1 herein and associated prior art. In particular, these latter prior art documents are not concerned with the provision of a gripping surface configured to engage into the reinforcing bars using a plurality of teeth, instead the tubular body is provided with a non-cylindrical inner surface such that the reinforcing bars, following engagement by the engaging bolts are wedged against a portion of the inner surface as detailed with reference to U.S. Pat. No. 6,202,282 and FIGS. 3, 4 and 12 therein. Through the provision of a non-cylindrical inner surface, the reinforcing bars are seated and wedged against discreet regions of the inner surface of the tubular body.

As such, all prior art documents identified above teach of a coupling device being configured to wedge the reinforcing bars against at least one inner surface of the tubular body, the surface(s) being flat or convex with respect to an outer radial surface of the reinforcing bars. Accordingly, the inventors have identified numerous disadvantages associated with such coupling devices found in the art and identified above, these include:

A common problem encountered with prior art coupling devices utilizing non-integrally formed ribs extending the length of the tubular body as illustrated above, is substantial bar slip in response to an applied tensile load. Bar slippage within the coupler body is a result of poor or minimal reinforcing bar—coupler contact. In particular, where the ribs are used as a gripping surface, the bars are susceptible to slip as a result of firstly, points of contact between the adjustably placed ribs and the coupler body and secondly, points of contact between the adjustably placed ribs and the reinforcing bars.

The utilization of gripping ribs, in the form of insertable ribs, within the tubular body necessitates a substantial amount of care be taken when assembling the coupling joint so as to ensure the ribs are not displaced from their mountings (light weld) on the inner surface of the tubular body. The displacement of a rib, within the tubular body, may result from contact between an end portion of a reinforcing bar and the rib at a region where the bar is introduced into the coupler body. If rib displacement does occur then either, the joint needs reassembling or if undetected, the joint is weakened yet further due to the incorrect alignment of the rib(s).

A profiled gripping surface, typically comprising teeth, which is located away from the tubular body inner surface and towards the center of the coupling device requires elaborate manufacture, or assembly in that either sophisticated tooling is required to form the tubular body having integrally formed ribs which project away from the inner surface or non-integrally formed ribs which are added after the formation of the tubular body. In the case where non-integrally formed ribs are provided it is common to observe incorrect positioning of the ribs within the tubular body resulting ultimately in poor rib—reinforcing bar contact, and a corresponding weak joint.

Through the utilization of a flat or convex gripping surface with respect to the radial outer surface of the reinforcing bars, minimal contact is achieved between the coupling device and the reinforcing bars resulting in reduced loading force transfer from the reinforcing bars to the coupling device. Additionally, the absence of teeth on the gripping surface(s), being in reduced contact with the reinforcing bars, does not provide for a strong couple.

As a consequence of this poor reinforcing bar—coupler interaction, at the gripping surface(s), penetration of the bars by the engagers is required so as to increase this interaction. This in turn creates additional disadvantages in that due to the penetration of the engagers into the reinforcing bars, breaking of the bars is experienced within the coupler body in response to a sufficiently high loading force applied laterally to the reinforcing bars.

The present invention endeavors to address and overcome the above identified disadvantages by providing a coupling device as detailed herein below.

SUMMARY OF THE INVENTION

Accordingly, the inventors provide a coupling device for coupling reinforcing bars, wires and cables, providing an increased interaction between the reinforcing bars and the coupling device via at least one recessed gripping surface positioned on the inner surface of an elongate tubular body configured for receiving end portions of reinforcing bars. The provision of the recessed gripping surface comprising a plurality of teeth allows the reinforcing bars to be seated correctly within the tubular body thus maximizing contact and interaction between the reinforcing bars and the coupling device. The provision of at least one recessed gripping surface being formed on the inner surface of the elongate tubular body allows for both reliably strong and efficient coupling of reinforcing bars. According to one aspect of the present invention there is provided a reinforcing bar coupler configured to join the reinforcing bars (rebars) with no weakness in the joint, i.e. the joint is stronger than the bars being joined. According to a specific implementation of the present invention a joint is provided where the joined bars when put under a tensile load, break in a region outside the coupler joint. In addition, and in response to an applied tensile load, the joint does not slip by any substantial amount.

The provision of at least one recessed gripping surface being formed integrally with the elongate tubular body minimizes the manufacturing cost and eliminates problems encounter with in situ coupling assembly identified above with regard to non-integrally formed ribs, providing instead more robust on-site handling.

According to one aspect of the present invention there is provided a coupling device for coupling reinforcing bars used in structural concrete comprising:

an elongate tubular body for receiving end portions of said reinforcing bars;

at least one face extending longitudinally on an inner surface of said tubular body;

a plurality of engagers being adjustably positioned through said tubular body;

said coupling device further comprising and being characterized by:

at least one recessed gripping surface being formed on said at least one face and extending longitudinally on said at least one face and;

a plurality of teeth being formed on said at least one recessed gripping surface, said teeth being configured to engage said reinforcing bars;

wherein said at least one recessed gripping surface is configured to grip said reinforcing bars in response to an engaging of said reinforcing bars by said plurality of engagers.

According to one embodiment of the present invention there is provided a coupling device comprising a pentagonal cross-sectional configuration having five longitudinally extending faces. Two gripping surfaces may be formed on two of these faces being in a substantially opposed region of the elongate tubular body relative to the plurality of engagers. Accordingly, the reinforcing bars are configured to partially sit within the two recessed gripping surfaces maintaining an extended contact with the gripping surfaces and accordingly the coupling device. Due to the secured positioning of the reinforcing bars within the tubular body, the engagers can be positively adjusted through the tubular body and into/onto the reinforcing bars thereby forming a strong couple being configured to prevent bar slippage at the joint.

According to a second embodiment of the present invention there is provided a coupling device comprising a substantially circular cross-sectional configuration wherein the inner surface comprises a single longitudinally extending face having at least one recessed gripping surface positioned in a substantially opposed region of the elongate tubular body relative to the plurality of engagers. According to this second embodiment the reinforcing bars are configured to seat correctly within the coupling device without resort to manually adjusting placement of the reinforcing bars within the coupling device. The engagers can then be positively adjusted through the tubular body and into/onto the reinforcing bars whereby extended contact is made between the reinforcing bars and the elongate tubular body, the coupling device thereby forming a strong couple.

According to further specific implementation of the present invention a strong couple/joint is achieved and maintained through the utilization of a tubular body having any geometrical cross-sectional configuration where at least one recessed gripping surface is formed on at least one face of the inner surface.

According to specific implementations of the present invention a coupling device is provided having a reduced length and diameter to that found in the art. Additionally, a coupling device is provided, as described herein, being configured to engage the reinforcing bars at the gripping surface(s) such that the core surface of the reinforcing bars (the surface not including the ribs formed on the reinforcing bars) is not engaged by the gripping surface(s), the gripping of the bars by the gripping surface(s) being provided by contact with the ribs of the reinforcing bar. According to specific implementations of the present invention at least one recessed gripping surface may comprise a radius of curvature being substantially equal to a radius of curvature of the core surface of the reinforcing bars at a cross section of the reinforcing bars or a radius of curvature of the reinforcing bars including the bar ribs at a cross section along the length of the bars.

According to a further aspect of the present invention the gripping surface(s) may comprise a radius of curvature extending perpendicular to a longitudinal axis of the elongate tubular body, where the radius of curvature may be equal to a radius of curvature of an outer surface of the reinforcing bars at a cross-section of the reinforcing bars. As such, contact between the gripping surface(s) and the reinforcing bars, and the corresponding gripping effect of the gripping surface(s) is extended over at least one large portion of the core surface of the reinforcing bars. Whereby, in response to an engaging of the reinforcing bars by the plurality of engagers, a strong couple is achieved and maintained due to this extended contact. Alternatively, the radius of curvature of the at least one recessed gripping surface may correspond to any radius of curvature being greater than the radius of curvature of the outer surface of the reinforcing bars at a cross-section of the reinforcing bars up to a maximum value corresponding to a circle having an infinite radius of curvature.

According to a further aspect of the present invention the plurality of teeth may extend substantially transverse to the elongate tubular body or may be formed as screw threads or alternatively termed helical threads, such teeth being formed preferably as ribs or ridges along the gripping surface. In addition, the plurality of teeth may be hardened with a hardness greater than that of either the elongate tubular body and/or the reinforcing bars. The teeth may be formed as ridges, these ridges extending away from the inner surface of the tubular body towards the centre of the tubular body.

In addition, at a cross-section through any one ridge, the ridge(s) may be symmetrical or unsymmetrical.

According to a further aspect of the present invention there is provided a coupling device wherein the plurality of engagers comprise different end portions, the different end portions being configured for a different engaging of the reinforcing bars. This different engaging of the bars including an engaging onto and into the reinforcing bars by the different end portions. For example, an engager comprising a first type of end portion may be configured to engage onto the reinforcing bars while an engager configured with a second or third type of end portion may be configured to engage into the reinforcing bars. The utilization of engagers comprising a plurality of different end portions allows the coupling device to maintain the coupling of reinforcing bars following a maximum loading force or tensile load applied to the reinforcing bars wherein at least one of the reinforcing bars breaks in a region outside the elongate tubular body following the applied maximum loading force. As such, a coupling device is provided according to one aspect of the present invention which is configured to maintain the coupling of reinforcing bars following the application of a maximum loading force, wherein the maximum loading force is defined as a loading force which results in the breaking of at least one reinforcing bar in a region outside the coupling device, the maximum loading force corresponding to the ultimate tensile strength of the bars.

As will be evident to the person skilled in the art, the coupling device as described herein is configurable for use in the coupling of cables, wires, bars or the like both used within the field of structural concrete and any type of use not limited to use within structural concrete.

The elongate tubular body may be described as a sleeve-like body or receiving body configured for positioning over and about the bars, wires or cables so as to provide a coupling joint. Additionally, means for engaging the bars, wires or cable may comprise a plurality of engagers as described herein or alternatively any form or engager may be employed so as to provide a means for wedging the bars, wires or cables against the recessed gripping surface (alternatively termed a recessed wedging surface). For example, the means for engaging may comprise a form of engager being adjustably positioned onto, partially into the bars, wires or cables so as to wedge, press or abut the same against the recessed gripping surface.

According to a further aspect of the present invention there is provided a coupling device for coupling reinforcing bars used in structural concrete comprising:

an elongate tubular body for receiving end portions of said reinforcing bars;

at least one face extending longitudinally on an inner surface of said tubular body;

a plurality of engagers being adjustably positioned through said tubular body;

said coupling device further comprising and being characterized by:

at least one recessed gripping surface being formed on said at least one face and extending longitudinally on said at least one face;

wherein said at least one recessed gripping surface is configured to grip said reinforcing bars in response to an engaging of said reinforcing bars by said plurality of engagers.

According to a further aspect of the present invention there is provided a coupling device for making joints in reinforcing bars or wires for structural concrete comprising:

a sleeve-like body for locating over and about portions of said bars or wires;

means to engage said bars or wires, said means to engage being adjustably positioned at an inner surface of said sleeve-like body;

said coupling device further comprising and being characterised by:

at least one gripping surface being formed as an indented surface on said inner surface of said sleeve-like body and;

a plurality of teeth being formed on said at least one gripping surface, said teeth being configured to engage said bars or wires;

wherein said at least one gripping surface is configured to grip said bars or wires in response to an engaging of said bars or wires by said means to engage.

According to a further aspect of the present invention there is provided a coupling device for coupling cable comprising:

a sleeve-like body for receiving and placement around end portions of said cable;

at least one face extending longitudinally on an inner surface of said sleeve-like body;

means to engage said cable, said means to engage being positioned at said inner surface of said sleeve-like body;

said coupling device further comprising and being characterised by:

at least one recessed gripping surface being formed on said at least one face and;

a plurality of teeth being formed on said at least one recessed gripping surface, said teeth being configured to engage said cable;

wherein said at least one recessed gripping surface is configured to grip said cable in response to an engaging of said cable by said means to engage.

According to a further aspect of the present invention there is provided a coupling device for coupling bars comprising:

an elongate tubular body for receiving end portions of said bars;

at least one face extending longitudinally on an inner surface of said tubular body;

a plurality of engagers being adjustably positioned through said tubular body;

said coupling device further comprises and being characterized by:

at least one recessed gripping surface being formed on said at least one face and extending longitudinally on said at least one face and;

a plurality of teeth being formed on said at least one recessed gripping surface, said teeth being configured to engage said bars;

wherein said at least one recessed gripping surface is configured to grip said bars in response to an engaging of said bars by said plurality of engagers.

According to a further aspect of the present invention there is provided a coupling device for coupling reinforcing bars used in structural concrete comprising:

an elongate tubular body for receiving end portions of said reinforcing bars;

at least one face extending longitudinally on an inner surface of said tubular body;

a plurality of longitudinally spaced holes within said tubular body;

a plurality of engagers being adjustably positioned in said holes, said engagers being positioned through said tubular body;

said coupling device being characterized by:

at least one recessed gripping surface being formed on said at least one face and extending longitudinally on said at least one face and;

a plurality of teeth being formed on said at least one recessed gripping surface, said teeth being configured to engage said reinforcing bars;

wherein said at least one recessed gripping surface is configured to grip said reinforcing bars in response to an engaging of said reinforcing bars by said plurality of engagers.

According to a further aspect of the present invention there is provided a coupling device for coupling bars comprising:

a receiving body for receiving end portions of said bars; means for engaging said bars, said means for engaging being adjustably positioned relative to said receiving body;

said coupling device being characterised by:

at least one recessed wedging surface being formed on an inner surface of said receiving body, said recessed wedging surface extending on said inner surface along a length of said receiving body; and a plurality of ridges being formed on said at least one wedging surface, said plurality of ridges being configured to engage said bars;

wherein said at least one wedging surface is configured to grip said bars in response to an engaging of said bars by said means for engaging.

Preferably, the receiving body comprises a hardness and/or a tensile strength being greater than that of said bars.

According to a further aspect of the present invention there is provided a method of coupling reinforcing bars used in structural concrete comprising the steps of:

receiving end portions of said reinforcing bars in an elongate tubular body;

adjustably positioning a plurality of engagers through said tubular body;

said method being characterized by the steps of:

gripping said reinforcing bars using a plurality of teeth being formed on at least one recessed gripping surface, said at least one recessed gripping surface being formed on at least one face of an inner surface of said tubular body, said at least one recessed gripping surface extending longitudinally on said at least one face and;

coupling said reinforcing bars using said tubular body in response to an engaging of said reinforcing bars by said plurality of engagers.

According to a further aspect of the present invention there is provided a coupling device for coupling reinforcing bars used in structural concrete comprising:

an elongate tubular body for receiving end portions of said reinforcing bars;

a plurality of faces extending longitudinally on an inner surface of said tubular body;

a plurality of engagers being adjustably positioned through said tubular body;

said coupling device further comprising and being characterized by:

at least one recessed gripping surface being formed on at least one face of said plurality of faces, said at least one gripping surface extending longitudinally on said at least one face and;

a plurality of teeth being formed on said at least one recessed gripping surface, said teeth being configured to engage said reinforcing bars;

wherein said at least one recessed gripping surface is configured to grip said reinforcing bars in response to an engaging of said reinforcing bars by said plurality of engagers.

Preferably, said device comprises a multifaceted said inner surface.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 2:
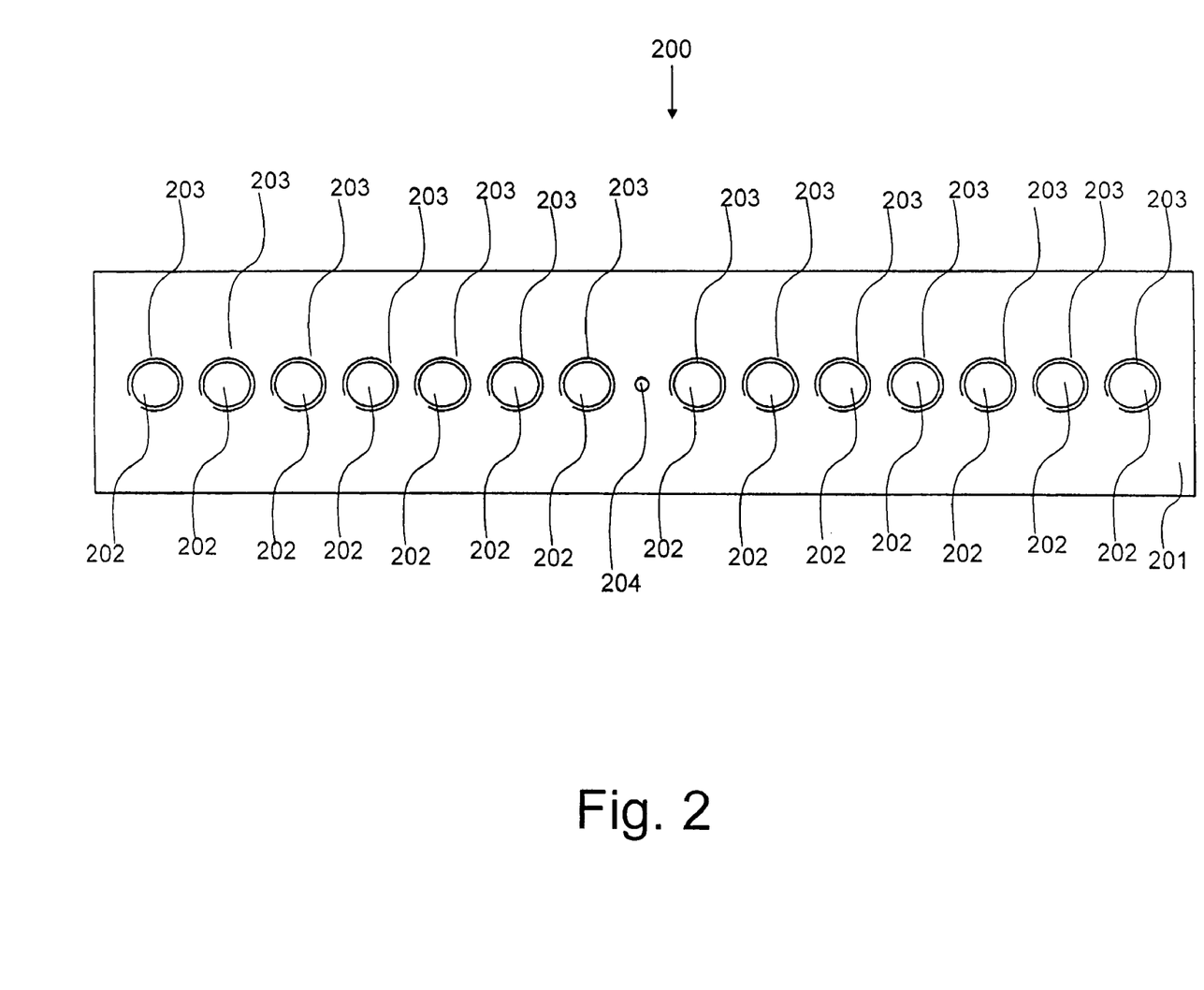
FIG. 2 illustrates a plan view of the coupling device tubular body according to one aspect of the present invention.

Referring to FIG. 2 herein there is illustrated a plan view of the bar coupling device according to the specific implementation of the present invention. The coupling device 200 comprises an elongate tubular body 201, a plurality of longitudinally spaced holes 202 and a centrally located hole 204, according to the specific implementation of the present invention. The elongate tubular body 201 is manufactured from a steel or similar material and comprises a sufficient thickness to enable a secure coupling of reinforcing bars 101 and to provide sufficient strength to carry the load applied. Through the elongate tubular body 201 there are provided a plurality of longitudinally spaced holes 202 being of a diameter to allow an engaging bolt, pin, rivet or screw to be removably positioned within each hole 202 so as to interface with an interior of the elongate tubular body 201.

According to the specific implementation of the present invention each of the longitudinally spaced holes 202 are provided with screw threads 203 being configured to engage with corresponding screw threads of an engaging bolt or screw.

Positioned centrally along the elongate tubular body 201 is provided hole 204 being configured to allow insertion and removal of a pin, which when positioned centrally within said elongate tubular body extends through an inner surface of the tubular body 201.

Figure 3:
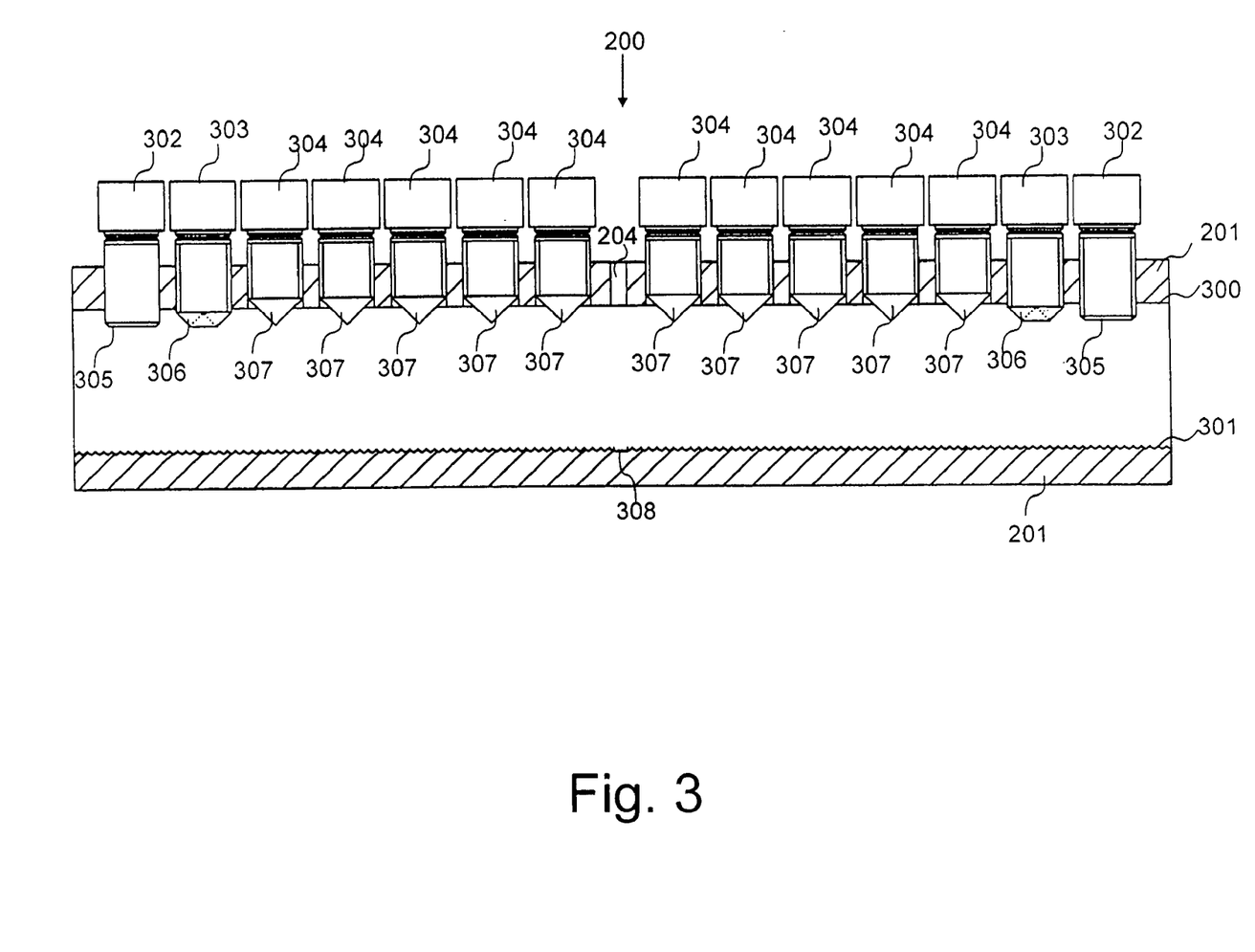
FIG. 3 illustrates a cross-sectional side elevation view of the coupling device according to one aspect of the present invention.

Referring to FIG. 3 herein there is illustrated a cross-sectional side elevation view of the coupling device according to the specific implementation of the present invention. Coupling device 200 is illustrated comprising the elongate tubular body 201 an inner surface 300 at least one recessed gripping surface 301 a plurality of engagers 302, 303 and 304. Adjustably positioned within the plurality of longitudinally spaced holes 203 the plurality of engagers 302, 303 and 304 are configured to engage the reinforcing bars to be coupled.

As is common to coupling devices found in the art, end portions of the reinforcing bars are received at the inner surface 300 of tubular body 201 whereby engagers 302, 303 and 304 are adjustably positioned to engage the reinforcing bars, in particular their end portions. According to the specific implementation of the present invention the plurality of engagers 302, 303 and 304 comprise different end portions 305, 306 and 307, where these end portions are configured for a different engaging of the reinforcing bars. In particular, end portions 305 are configured to engage onto the reinforcing bars, end portions 306 are configured for engaging partially into the reinforcing bars while end portions 307 are configured for an engaging into the reinforcing bars. According to the specific implementation of the present invention a plurality of engagers comprising different end portions are provided wherein the coupling device is configured to control the penetration of the plurality of engagers such that the cross-sectional area of the reinforcing bars within the tubular body is not reduced below a value where bar breakage within the coupler body occurs, that is any point along the bars functioning below their ability to transfer load from bar to coupler body. According to the specific implementation of the present invention end portions 305, 306 and 307 are configured with a hardness greater than that of the elongate tubular body and/or the reinforcing bars, in particular their end portions.

According to further specific implementations of the present invention positively adjustable engagers 302, 303 and 304 comprise bolts, screws, pins or rivets configured with identical end portions for identical engaging of the reinforcing bars.

According to the specific implementation of the present invention the elongate tubular body 201 is provided with at least one recessed gripping surface 301 being formed on at least one face of inner surface 300, recessed gripping surface 301 extending longitudinally on the face and elongate tubular body 201. Recessed gripping surface 301 is configured to grip the reinforcing bars, in particular their end portions, in response to an engaging of the reinforcing bars by the plurality of engagers 302, 303 and 304, in particular their end portions 305, 306 and 307 according to the specific implementation of the present invention.

The centrally located removably insertable pin is provided through hole 204, passing through inner surface 300 and tubular body 201 to seat at a central point within tubular body 201 at 368.

According to the specific implementation of the present invention the sleeve-like body may comprise a hardness and/or a tensile strength being greater than that of prior art devices. Accordingly, a stronger sleeve-like body is provided allowing smaller body cross-sections and/or the ability to apply increased torque to each engager with reduced risk of shearing screw threads 203 provided on holes 202. Accordingly, sleeve-like body 201 may be formed with a hardness greater than that of the reinforcing bars owing to the bars being seated correctly within the tubular body, the tubular body not being required to deform around the reinforcing bars as is known within the art.

According to a specific implementation of the present invention the coupler body comprises a greater yield strength and ultimate tensile strength to those found in the art.

Figure 4:
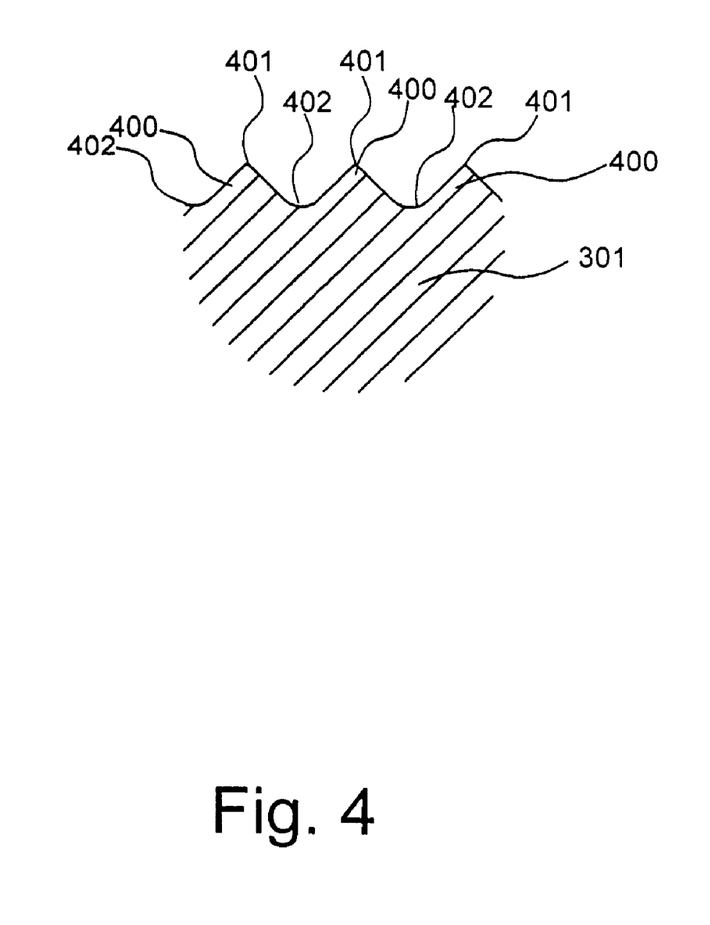
FIG. 4 illustrates a cross-sectional side elevation view of the plurality of teeth being formed on at least one gripping recessed surface according to one aspect of the present invention.

Referring to FIG. 4 herein there is illustrated a cross-sectional side elevation view of a section of at least one recessed gripping surface 301 according to the specific implementation of the present invention. A plurality of teeth 400 are formed on the recessed gripping surface 301, whereby the teeth are configured to engage the reinforcing bars, in particular their end portions. According to the specific implementation of the present invention teeth 400 are formed as a plurality of ridges, these ridges extending over a distance of the inner surface 301 and comprise peaks 401 and troughs 402. According to the specific implementation of the present invention teeth 400 are symmetrical through a cross-section of peaks 401 being defined by bisecting lines. According to specific implementations of the present invention the pitch of the teeth, nature of the troughs and peaks are optimized to ensure a maximum gripping effect of the reinforcing bars for a variety of both reinforcing bar diameter and corresponding elongate tubular body diameter. Teeth 400 are formed on all recessed gripping surfaces 301 of the tubular body 201 according to the specific implementation of the present invention. Teeth 400 may be configured with a hardness greater than that of the reinforcing bars and/or the tubular body.

According to a further specific implementation of the present invention teeth 400 comprise individual raised portions being cones, square based pyramids, and any form of pointed projection, being either symmetrical or asymmetrical.

Figure 5A:
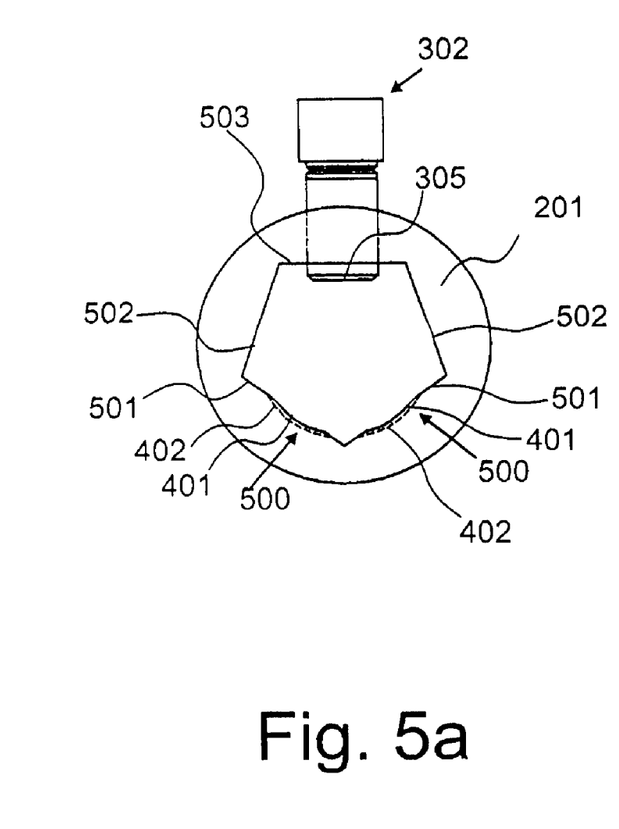
FIG. 5a illustrates an end view of the coupling device according to one aspect of the present invention.

Referring to FIG. 5a herein there is illustrated an end view of the coupling device comprising elongate tubular body 201, positively adjustable engager 302, and inner surface 300 of tubular body 201 wherein the inner surface is divided into five faces providing a pentagonal inner surface cross-section, according to the specific implementation of the present invention. The five faces 501, 502 and 503 extending longitudinally on inner surface 300, inner surface 300 extending longitudinally within tubular body 201 to define a pentagonal shape through a cross-section of the tubular body 201 along substantially the full length of coupling device 200. An engager 302 being adjustably positioned within holes 203 through tubular body 201 are emergent through inner surface 300 at pentagonal face 503, pentagonal face 503 being in a substantially opposed region of tubular body 201 to pentagonal faces 501. Substantially opposed regions being an upper and lower half of the coupling device, or tubular body, when aligned as illustrated in FIG. 5a herein.

According to the specific implementation of the present invention two recessed gripping surfaces 500 are provided on two faces extending longitudinally on inner surface 300 and tubular body 201. Recessed gripping surfaces 500 comprise a plurality of teeth 400 as illustrated with reference to FIG. 4 herein. According to the specific implementation of the present invention both recessed gripping surfaces 500 comprise a radius of curvature extending perpendicular to a longitudinal axis of tubular body 201, the radius of curvature of gripping surfaces 500 being substantially equal to a radius of curvature of an outer surface of the reinforcing bars, in particular their end portions, at a cross-section of the reinforcing bars.

Each recessed gripping surface 500 being formed on faces 501 define two arcs of a circle, where the circle has a central point being positioned off-set relative to a central point of a cross-section of the tubular body 201.

Figure 5B:
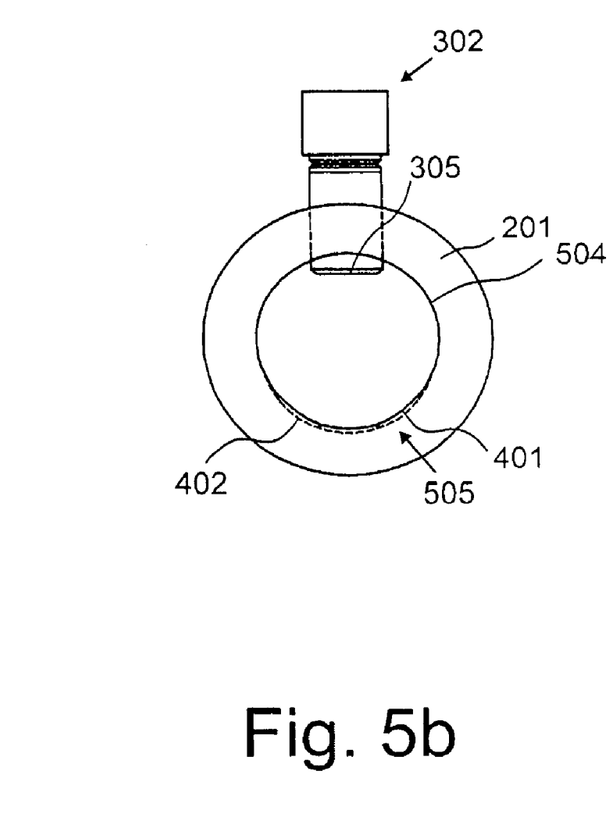
FIG. 5b illustrates an end view of the coupling device according to one aspect of the present invention.

Referring to FIG. 5b herein there is illustrated an end view of the coupling device according to a further specific implementation of the present invention comprising an elongate tubular body 201, and positively adjustable engagers 302, with the body including an inner surface comprising a single face 504 and at least one recessed gripping surface 505. According to the further specific implementation of the present invention inner surface 300 and inner face 504, at any cross-section through tubular body 201, define a circular or circular like shape, or similar, extending longitudinally within tubular body 201. The general mode of operation of the further specific implementation of the present invention as detailed with reference to FIG. 5b herein is similar to the implementation as described with reference to FIG. 5a herein. However, according to the further specific implementation of the present invention a single recessed gripping surface 505 is provided at a substantially opposed region of the tubular body 201 in relation to the plurality of positively adjustable engagers 302, 303 and 304.

According to the further specific implementation of the present invention a plurality of teeth are provided on the recessed gripping surface 505, the teeth having peaks 401 and troughs 402 where both peaks 401 and troughs 402 are aligned on a first and second radius of curvature being identical to that detailed with reference to FIG. 5a and corresponding to a radius of curvature of an outer surface of the reinforcing bars end portions at a cross-section of the reinforcing bars.

Figure 6:
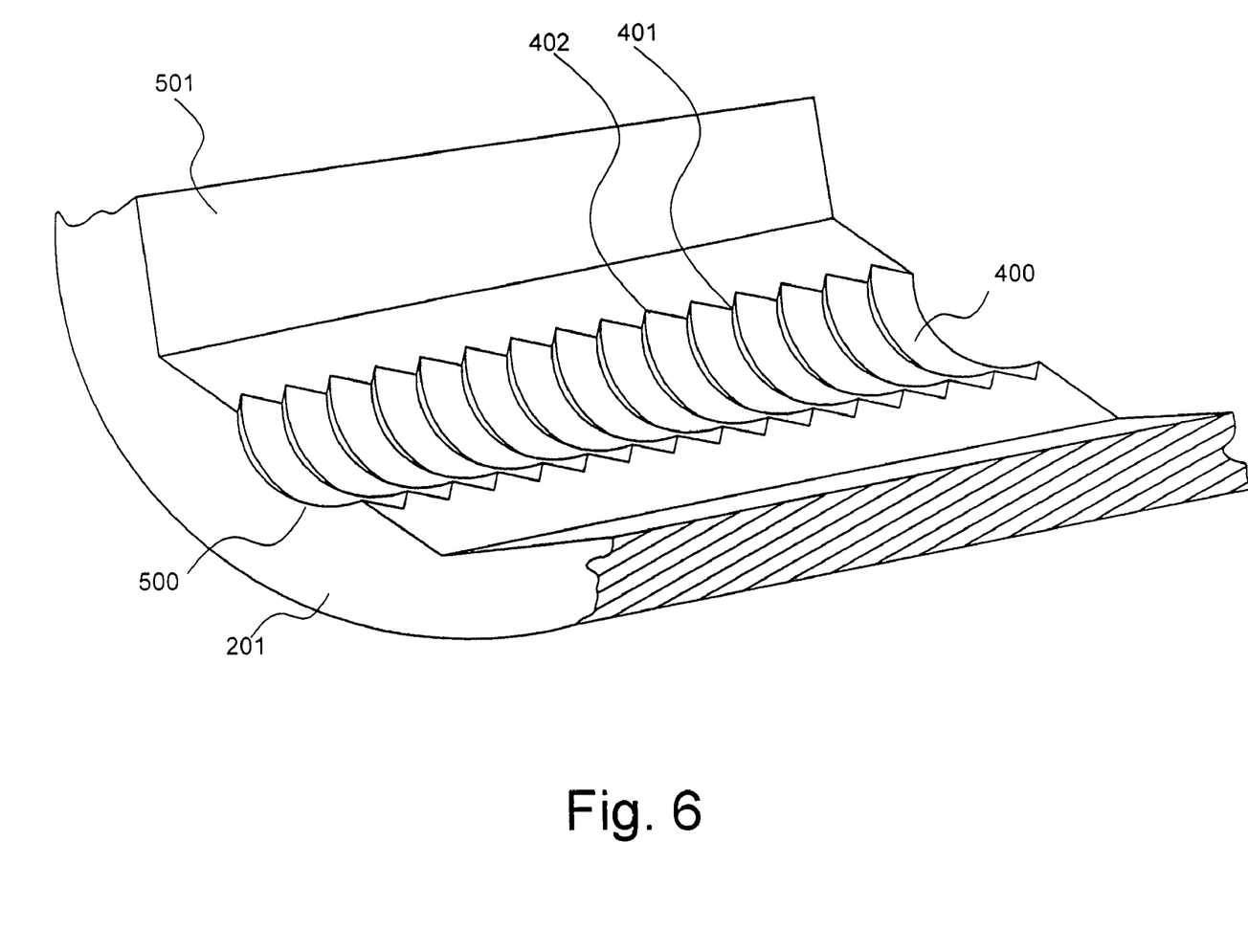
FIG. 6 illustrates a perspective view of the at least one recessed gripping surface being formed on an inner surface of the coupling device according to one aspect of the present invention.

Referring to FIG. 6 herein there is illustrated a perspective view of the coupling device according to the specific implementation of the present invention comprising tubular body 201 and at least one face 501 extending longitudinally on inner surface 300 on tubular body 201. At least one recessed gripping surface is formed on at least one face 501, gripping surface 500 being configured to engage said reinforcing bars, in particular their end portions by interaction and contact with the outer surface of the reinforcing bars via a plurality of teeth being formed on gripping surface 500. Teeth 400 form ridges having peaks 401 and troughs 402, each being aligned on a separate radius of curvature corresponding to a first and second arc of a first and second circle being positioned as described with reference to FIGS. 5a and 5b. Teeth 400, being ridges, extend substantially transverse to the elongate tubular body 201 and in particular a longitudinal axis of tubular body 201.

According to a further specific implementations of the present invention teeth 400 need not be ridges and may comprise any form of projection being provided on the at least one recessed gripping surface.

Figure 7:
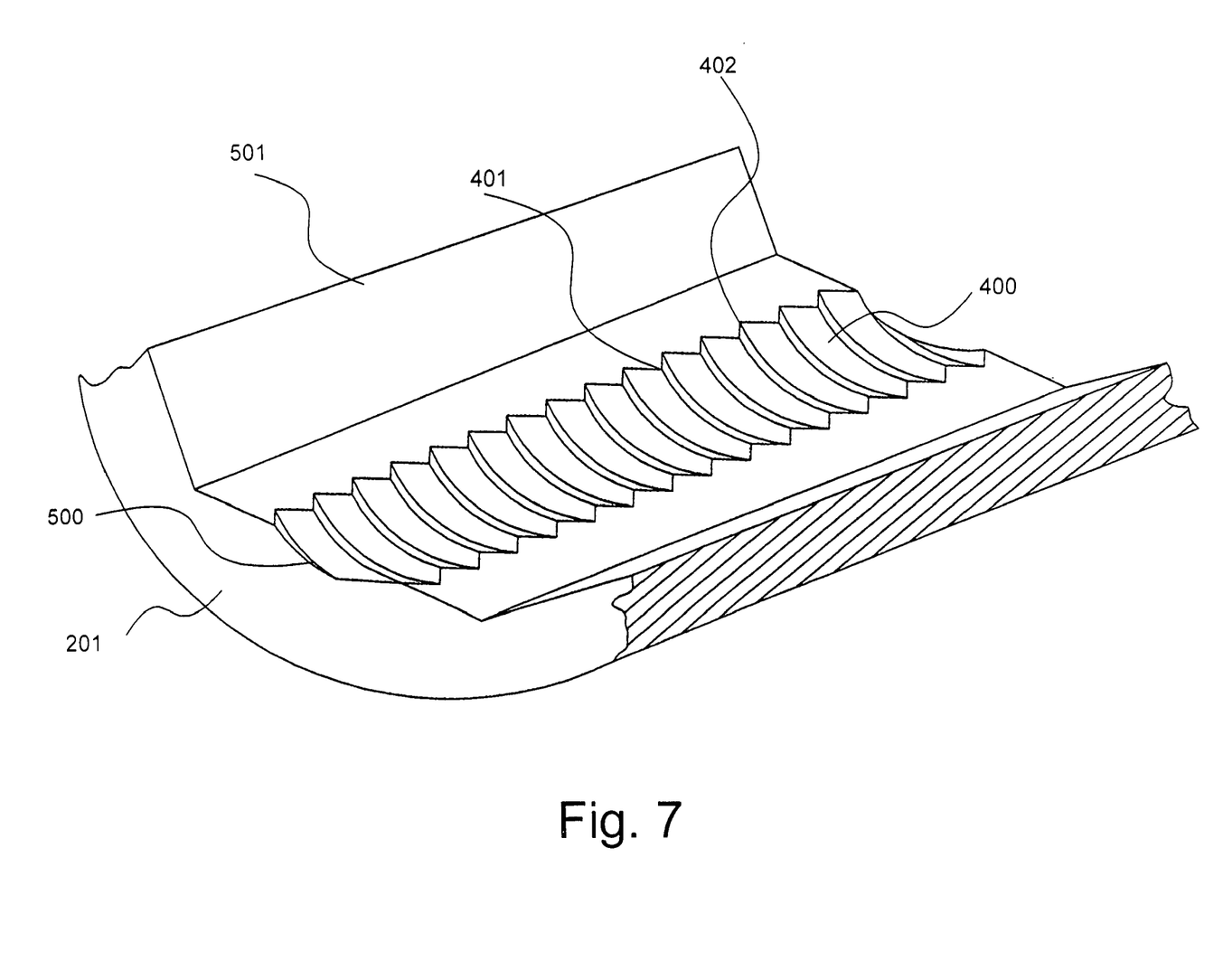
FIG. 7 illustrates a perspective view of the at least one recessed gripping surface being formed on an inner surface of the coupling device according to one aspect of the present invention.

Referring to FIG. 7 herein there is illustrated a perspective view of the coupling device according to a further specific implementation of the present invention comprising tubular body 201 having at least one inner face 501 extending longitudinally on inner surface 300 of tubular body 201. FIG. 7 herein illustrates the coupling device comprising teeth 400 being formed on gripping surface 500 comprising a series of peaks 401 and troughs 402 being similar to those described with reference to FIG. 6 save for the alignment of the teeth relative to a longitudinal axis of the elongate tubular body 201. According to the further specific implementation of the present invention the plurality of teeth 400 are formed as screw threads, the direction of the screw threads being formed as a plurality of helically distributed ridges extending the length of gripping surface 500. The ridges formed by peaks 401 and troughs 402 extend at an angle relative to a perpendicular cross-section through tubular body 201.

Figure 8A:
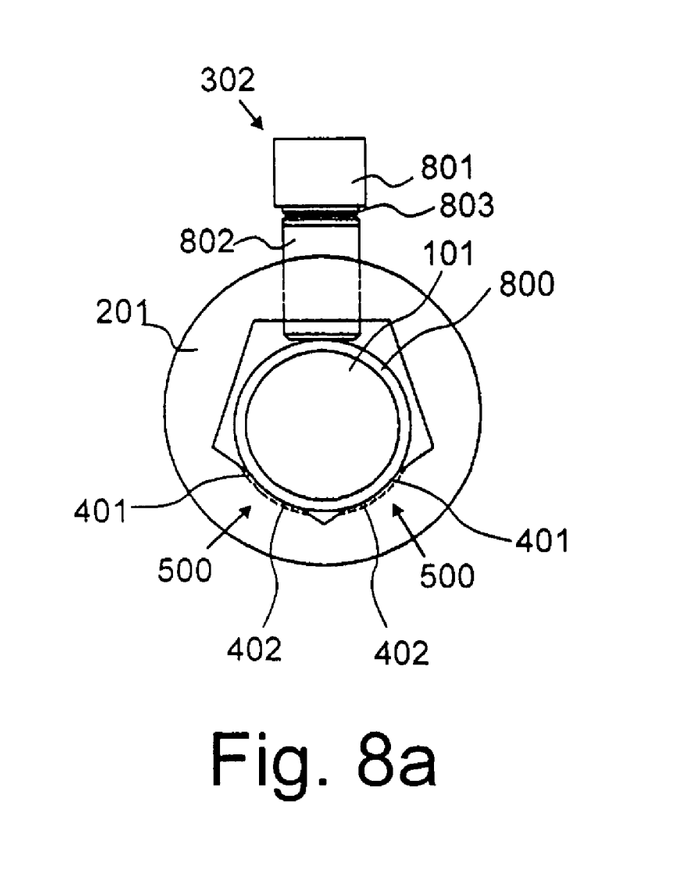
FIG. 8a illustrates an end view of the coupling device according to one aspect of the present invention.

Referring to FIG. 8a herein there is illustrated an end view of the coupling device according to the specific implementation of the present invention comprising tubular body 201, at least one recessed gripping surface 500, and the plurality of engagers 302, 303 and 304. In operation, the coupling device 200 is configured to receive reinforcing bars, in particular their end portions, and to grip and couple the reinforcing bars 101 via gripping surfaces 500 and teeth 400 being formed on surfaces 500 in response to an engaging of the reinforcing bars 101 by the plurality of engagers.

According to the specific implementation of the present invention the reinforcing bars 101 are seated on the recessed gripping surfaces 500 whereby due to the radius of curvature of gripping surfaces 500, extended contact is achieved and maintained between the coupling device 200 and the reinforcing bars 101. Additionally, time and effort need not be given to ensure reinforcing bars 101 are seated correctly within the coupling device 200 due to the provision of the recessed gripping surfaces 500 having radii of curvature being substantially equal to the radius of curvature of the outer surface of the reinforcing bars 101. As is common to reinforcing bars used in structural concrete, bars 101 typically comprise ribs 800 extending over a portion of the reinforcing bars outer surface. The radius of curvature of gripping surfaces 500 is provided so as to be substantially equal to a radius of curvature of the reinforcing bars 101 either at the core surface of the bars 101 or an outer surface formed by ribs 800. As such, and as a result of both the correct seating of reinforcing bars within the coupling device 200 and recessed gripping surfaces 500, and the extended contact between reinforcing bars 100 and gripping surfaces 500 (via teeth 400) longitudinal displacement (i.e. bar slip) of the bars relative to the coupling device is substantially restricted. In particular, the coupling device according to the specific implementation of the present invention is configured to maintain a coupling of the reinforcing bars 101 following a maximum loading force applied to the reinforcing bars, this maximum loading force being applied in a substantially lateral direction relative to the reinforcing bars and coupling device. The coupling device according to all specific implementations described herein with reference to FIGS. 2, 3, 4, 5a, 5b, 6, 7, 8a, 8b and 9 is configured to maintain a bar couple or bar joint, up to and including the ultimate tensile strength of the bars after which loading force at least one reinforcing bar breaks in a region substantially outside the region of the elongate tubular body 201.

The coupling device as described herein is configured to maintain a bar couple up to and including the ultimate tensile strength of the bars, such forces being applied to the bar joint as a result of the positioning of the bar within any particular concrete structure. For example, a compressive force would be resultant on the coupling device when aligned substantially vertically and positioned within a substantially vertical pillar being configured to support an elevated structure. Conversely, a tensile force applied to the coupling device would result from the positioning of the coupling device in a substantially horizontal alignment within a horizontal structure involving a substantially perpendicular or transverse loading force applied from above, for example. According to all specific implementations of the present invention the coupling device is configured to maintain a bar couple up to and including the ultimate tensile strength of the bars irrespective of the nature of forces applied e.g. tensile or compressive.

According to the specific implementation of the present invention positively adjustable engagers 302, 303 and 304 are configured with a head portion 801 and a body portion 802, portions 801 and 802 being separated by a shear band 803 configurable such that in response to an applied torque force and following an engaging of engagers 302, 303 and 304 onto/into reinforcing bars 101 head portion 801 is configured to separate from body portion 802 via shear band 803.

Figure 8B:
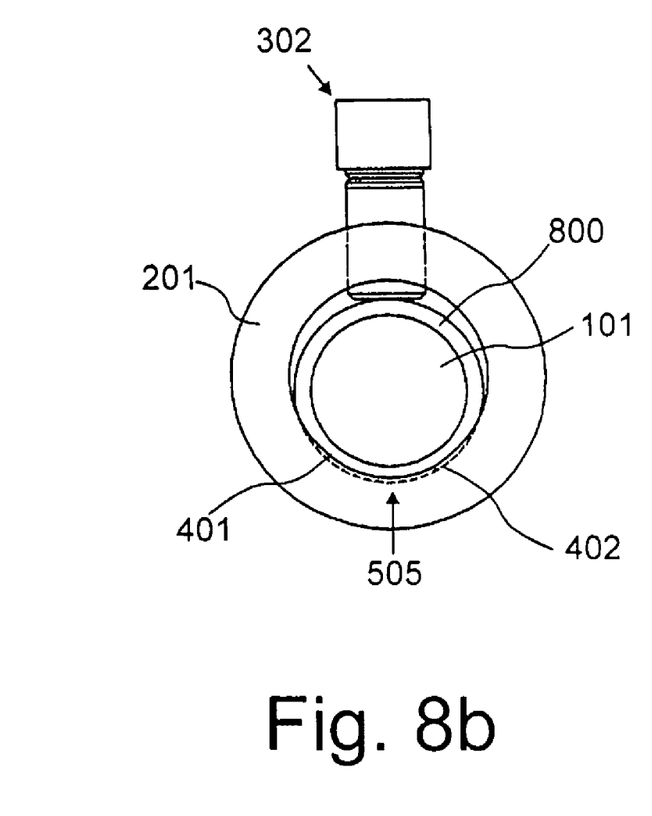
FIG. 8b illustrates an end view of the coupling device according to one aspect of the present invention.

Referring to FIG. 8*b* herein there is illustrated an end view of the coupling device according to the further specific implementation as detailed with reference to FIG. 5*b*. In operation, reinforcing bars are received by tubular body 201 and seated on at least one recessed gripping surface 505 such that, and as with the coupling device described with reference to FIG. 8*a*, the reinforcing bars 101 are seated slightly towards the lower region of the coupling device due to the seating within the recessed gripping surface. Engagers 302, 303 and 304 engage onto/into the reinforcing bars 101 thereby pressing or wedging the bars 101 against at least one recessed gripping surface and in particular teeth 400 formed on the gripping surface.

Figure 9:
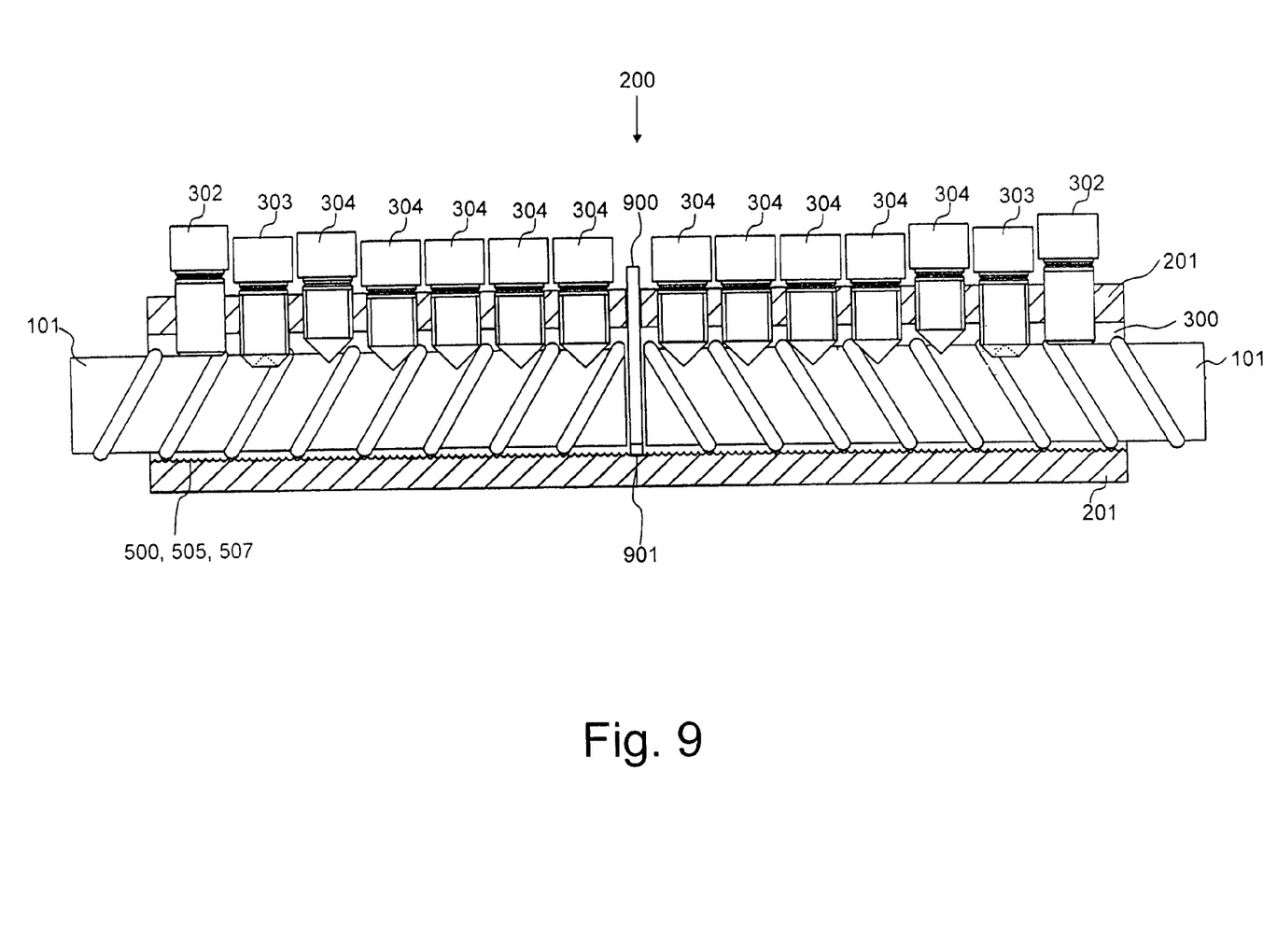
FIG. 9 illustrates a cross-sectional side elevation view of the coupling device according to one aspect of the present invention.

Referring to FIG. 9 herein there is illustrated a cross-sectional side elevation view of the coupling device according to the specific implementation of the present invention comprising an elongate tubular body 102, an inner surface 300, a plurality of engagers, 302, 303 and 304, and at least one recessed gripping surface 500, 505 and 507. In a specific mode of operation, pin 900 is removably inserted through hole 204 positioned centrally within tubular body 201 and extending through inner surface 300 so as to prevent any one of reinforcing bars 101 extending longitudinally beyond a central cross-section 901 of tubular body 201.

Pin 900 is removably insertable through hole 204 such that according to a specific mode of joint assembly, tubular body 201 is slid fully over a single reinforcing bar 101. A second reinforcing bar is then correctly aligned relative to the reinforcing bar over which is positioned the tubular body such that tubular body 201 is displaced over the bar joint region. Pin 900 is then inserted and engagers 302, 303 and 304 are then adjusted to engage the reinforcing bars 101 thereby forming the couple.

Positively adjustable engagers 302, 303 and 304 are positioned and adjusted in holes 203 to engage the reinforcing bars 101. In response, reinforcing bars 101 are pressed or wedged against at least one recessed gripping surface 500, 505 and 507 whereby a couple is formed between reinforcing bars 101. Through the provision and relative positioning of, in part, engagers 302, 303 and 304 having end portions 305, 306 and 307, respectively, in addition to at least one recessed gripping surface 500, 505 and 507, the coupling device 200, according to all specific implementations described herein, is configured to establish and maintain, without substantial bar strip, a coupling of reinforcing bars 101 up to and including the ultimate tensile strength of the bars. It will be further appreciated by those in the art that the coupling device as described herein is not restricted to the utilization of engaging bolts having a plurality of different end portions being functional instead with any manner of engagers having the same or similar end portions according to further specific implementations of the present invention.

According to the specific implementation of the present invention engagers 302 comprise a first type of end portion configured for engaging onto reinforcing bars 101, engagers 303 comprise a second type of end portion configured for engaging partially into the reinforcing bars 101 and engagers 304 comprise a third type of end portion configured for engaging into the reinforcing bars 101.

It will be appreciated by those skilled in the art that the coupling device as described herein with reference to any one of the accompanying drawings is not limited to the coupling of reinforcing bars having a particular diameter. Instead the coupling device as described herein is universally applicable to coupling reinforcing bars having a variety of bar diameters, using any number of a plurality of engagers each configured with any type of end portions.

The invention claimed is:

1. A coupling device for coupling reinforcing bars used in structural concrete comprising:
   an elongate tubular body for receiving end portions of said reinforcing bars;
   at least one face extending longitudinally on an inner surface of said tubular body;
   a plurality of threaded engagers being adjustably positioned through threaded holes in said tubular body;
   at least one recessed gripping surface being formed on said at least one face and extending longitudinally on said at least one face;
   a plurality of teeth formed on said at least one recessed gripping surface, said teeth configured to grip said reinforcing bars in response to an engaging of said reinforcing bars by said plurality of engagers;
   said coupling device characterised in that:
   at a cross section of said tubular body said at least one recessed gripping surface defines an arc of a circle having a central point positioned off-set relative to a central point of a cross section of said tubular body; and
   wherein a toothed portion of said recessed gripping surface is substantially diametrically opposite relative to at least some of said plurality of engagers.

2. The combination as claimed in claim 1, in combination with said reinforcing bars, wherein said reinforcing bars are engaged by said engagers and said recessed gripping surface.

3. The combination as claimed in claim 1 wherein said recessed gripping surface comprises a radius of curvature providing extended contact between said gripping surface and said reinforcing bars.

4. The combination as claimed in claim 2 wherein said elongate tubular body comprises a hardness and/or a tensile strength being greater than that of said reinforcing bars.

5. The combination as claimed in claim 2 wherein a radius of curvature of said teeth corresponds to a radius of curvature of an outer surface of said reinforcing bars at a cross-section of said reinforcing bars.

6. The combination as claimed in claim 2 wherein a radius of curvature of said teeth corresponds to a radius of curvature of a core surface of said reinforcing bars at a cross-section of said reinforcing bars.

7. The combination as claimed in claim 2 wherein said teeth are configured with a hardness greater than that of said reinforcing bars.

8. The combination as claimed in claim 2, wherein said recessed gripping surface engages said reinforcing bars over an angular circumferential extent of at least 90 degrees.

9. The combination as claimed in claim 2,
wherein said reinforcing bars each include a reinforcing bar core, and reinforcing bar ribs formed on said reinforcing bar core; and
wherein said recessed gripping surface engages only said ribs of said reinforcing bars, and does not engage said cores of said reinforcing bars.

10. The coupling device as claimed in claim 1 wherein said recessed gripping surface is configured to seat said reinforcing bars within said tubular body.

11. The coupling device as claimed in claim 1 wherein said plurality of engagers comprise different types of end portions having different respective end portion shapes, configured for different respective types of engagings of said reinforcing bars.

12. The coupling device as claimed in claim 1 wherein said plurality of engagers comprises:
an engager comprising a first type of end portion having a concave recess shape tip, configured to engage partially into said reinforcing bars; and
an engager comprising a second type of end portion having a pointed tip, configured to engage substantially into said reinforcing bars.

13. The coupling device as claimed in claim 12 wherein said plurality of engagers further comprise an engager comprising a third type of end portion having a blunt tip, configured to engage onto said reinforcing bars.

14. The coupling device as claimed in claim 1 wherein said teeth comprise a plurality of ridges.

15. The coupling device as claimed in claim 14 wherein each ridge of said ridges extends substantially transverse to a length of said elongate tubular body.

16. The coupling device as claimed in claim 14 wherein said ridges comprise screw threads.

17. The coupling device as claimed in claim 14 wherein said ridges are configured with a hardness greater than that of said elongate tubular body.

18. The combination as claimed in claim 1, wherein said toothed portion is a toothed central portion of said recessed gripping surface.

19. A coupling device for coupling bars comprising:
an elongate tubular body for receiving end portions of said bars;
a plurality of threaded engagers being adjustably positioned through threaded holes in said tubular body for engaging said bars;
a recessed gripping surface indented on an inner surface of said tubular body and extending longitudinally within said tubular body;
a plurality of ridges formed on said recessed gripping surface;
said coupling device characterised in that:
each ridge of said plurality of ridges extends transverse to a longitudinal axis of said recessed gripping surface;
wherein said recessed gripping surface is configured to seat said bars within said tubular body and said plurality of ridges are configured to grip said bars in response to an engaging of said bars by said plurality of engagers; and
wherein a ridged portion of said recessed gripping surface is substantially diametrically opposite relative to at least some of said plurality of engagers.

20. The combination as claimed in claim 19, in combination with said reinforcing bars, wherein said reinforcing bars are engaged by said engagers and said recessed gripping surface.

21. The combination as claimed in claim 20 wherein said ridges comprise a radius of curvature configured to correspond to a radius of curvature of said bars at a cross-section of said bars.

22. The combination as claimed in claim 20 wherein said ridges comprise a radius of curvature being substantially equal to a radius of curvature of an outer surface of said bars at a cross-section of said bars.

23. The combination as claimed in claim 20 wherein said ridges are configured with a hardness greater than that of said bars.

24. The combination as claimed in claim 20, wherein said recessed gripping surface engages said reinforcing bars over an angular circumferential extent of at least 90 degrees.

25. The combination as claimed in claim 20,
wherein said reinforcing bars each include a reinforcing bar core, and reinforcing bar ribs formed on said reinforcing bar core; and
wherein said recessed gripping surface engages only said ribs of said reinforcing bars, and does not engage said cores of said reinforcing bars.

26. The coupling device as claimed in claim 19 wherein said ridges are configured with a hardness greater than that of said elongate tubular body.

27. The coupling device as claimed in claim 19 wherein said plurality of engagers comprise different types of end portions having different respective end portion shapes, configured for different types of respective engagings of said bars.

28. The coupling device as claimed in claim 19 wherein said plurality of engagers comprises:
an engager comprising a first type of end portion having a concave recess shape tip, configured to engage partially into said reinforcing bars; and
an engager comprising a second type of end portion having a pointed tip, configured to engage substantially into said reinforcing bars.

29. The coupling device as claimed in claim 28 wherein said plurality of engagers further comprise an engager comprising a third type of end portion having a blunt tip, configured to engage onto said bars.

30. The combination as claimed in claim 19, wherein said toothed portion is a toothed central portion of said recessed gripping surface.

31. A combination of reinforcing bars and a coupling device for coupling the reinforcing bars, the coupling device comprising:
a tubular body for locating over and about portions of said bars, said tubular body having an inner surface;
a plurality of threaded engagers being adjustably positioned through threaded holes in said tubular body for engaging said bars;
a plurality of ridges indented on said inner surface and extending longitudinally within said tubular body, each ridge of said plurality of ridges extending transverse to a longitudinal axis of said tubular body;

said coupling device characterised in that:
at a cross-section of said tubular body said ridges define an arc of a circle having a central point positioned off-set relative to a central point of a cross-section of said tubular body;
wherein said ridges are configured to grip said bars in response to an engaging of said bars by said plurality of engagers;
wherein a portion of each of said ridges is substantially diametrically opposite relative to at least some of said plurality of engagers;
wherein said reinforcing bars are engaged by said engagers and said ridges; and wherein said ridges engaged said reinforcing bars over an angular circumferential extent of at least 90 degrees.

32. The combination as claimed in claim 31 wherein said plurality of ridges define a recessed gripping surface indented on said inner surface at a region of said inner surface opposed to said plurality of engagers.

33. The combination as claimed in claim 31 wherein said ridges comprise a hardness greater than that of said tubular body.

34. The combination as claimed in claim 31 wherein said ridges comprise a radius of curvature configured to correspond to a radius of curvature of said bars at a cross-section of said bars.

35. The combination as claimed in claim 31 wherein said bars are reinforcing bars used in structural concrete.

36. The combination as claimed in claim 31 wherein a radius of curvature of said plurality of ridges provides extended contact between said coupling device and said bars.

37. The combination as claimed in claim 31 wherein said plurality of engagers comprise different types of end portions having different respective end portion shapes, configured for different types of respective engagings of said bars.

38. The combination as claimed in claim 31 wherein said plurality of engagers comprises:
an engager comprising a first type of end portion having a concave recess shape tip, configured to engage partially into said reinforcing bars; and
an engager comprising a second type of end portion having a pointed tip, configured to engage substantially into said reinforcing bars.

39. The combination as claimed in claim 38 wherein said plurality of engagers further comprise an engager comprising a third type of end portion having a blunt tip, configured to engage onto said bars.

40. The combination as claimed in claim 31,
wherein said reinforcing bars each include a reinforcing bar core, and reinforcing bar ribs formed on said reinforcing bar core; and
wherein said ribs engage only said ribs of said reinforcing bars, and does not engage said cores of said reinforcing bars.

* * * * *

UNITED STATES PATENT AND TRADEMARK OFFICE
CERTIFICATE OF CORRECTION

PATENT NO.         : 7,107,735 B2
APPLICATION NO. : 10/974610
DATED              : September 19, 2006
INVENTOR(S)        : Ian Hopwood It is certified that error appears in the above-identified patent and that said Letters Patent is hereby corrected as shown below:

Title page,
Related U.S. Application Data (item 63), line 2, replace "Nov. 13, 2003." with --Jan. 30, 2003.--.
Foreign Application Priority Data (item 30), insert --May 1, 2002  GB 0209943.0--.
Foreign Application Priority Data (item 30), insert --May 1, 2002  GB 0209944.8--.

Signed and Sealed this

Nineteenth Day of December, 2006

JON W. DUDAS
*Director of the United States Patent and Trademark Office*